United States Patent [19]

Wilcox

[11] 3,968,996
[45] July 13, 1976

[54] VEHICLE WHEEL
[76] Inventor: Raymond J. Wilcox, 44 Via Casitas, San Luis Rey Downs, Calif. 92068
[22] Filed: Nov. 27, 1974
[21] Appl. No.: 527,555

[52] U.S. Cl. .............................................. 301/37 R
[51] Int. Cl.² ........................................ B60B 3/06
[58] Field of Search ................. 301/5 R, 37 R, 37 P, 301/63 R, 63 PW

[56] References Cited
UNITED STATES PATENTS
3,669,501    4/1972    Derieta .............................. 301/37 P Primary Examiner—Stanley H. Tollberg
Attorney, Agent, or Firm—Reising, Ethington, Barnard, Perry and Brooks

[57] ABSTRACT

Polyurethane foam is used in a three-piece vehicle wheel as a load bearing and load transmitting structural element. The rim of the wheel, an inner wheel disc, and an outer decorative wheel disc are bonded together by the polyurethane foam. The rim includes an interlock lip to interlock the rim with the inner disc and an interlock lip that interlocks the rim with the outer decorative disc. The wheel can be manufactured by placing the rim, inner disc, and outer disc in a die and injecting the polyurethane foam composition into the interconnected volume enclosed and defined by those wheel components. The foam curing process then occurs in situ. Alternatively, the rim, inner disc, and outer disc can be adhesively bonded to a preformed polyurethane foam member. The resultant vehicle wheel, manufactured by either process, is characterized by high strength, light weight, and a decorative appearance.

11 Claims, 4 Drawing Figures

VEHICLE WHEEL

BACKGROUND OF THE INVENTION

1. Field Of The Invention

This invention relates to a vehicle wheel.

2. Description Of The Prior Art

The design concepts and production techniques used in the manufacture of vehicle wheels for the automotive industry have not been significantly changed for many years. The only notable exception was the introduction of styled wheels in the 1960's. Styled wheels do not require hubcaps or other wheel covers, and their popularity has grown continuously since their introduction. Nonetheless, the conventional steel disc wheel still predominates.

Vehicle wheels have been fabricated from synthetic plastic materials. U.S. Pat. No. 3,790,220 illustrates and describes such a plastic wheel. As noted in that patent, these wheels have not been competitive with steel wheels. Rather plastic wheels have been especially, though not exclusively, intended for use with vehicles such as transport carts, fork lifts, and the like, having small diameter wheels.

Plastic materials are also known for use as elements in otherwise metal wheels. For example, U.S. Pat. No. 3,790,219 discloses the use of expanded polyurethane or polystyrene foam, or any other honeycomb plastic material, for use as a spacer, or packing element, in wrought metal wheels. The wheels which are the subject of U.S. Pat. No. 3,790,219 are wheels manufactured from light-weight alloys such as alloys of magnesium for high performance cars.

Polyurethane foam is also known for use as an adhesive to bond ornamental plastic wheel covers to conventional steel disc wheels. U.S. Pat. No. 3,669,501 shows such an application of polyurethane foam. As pointed out in that patent, the wheel is of conventional construction, i.e., the wheel is the conventional steel disc wheel which predominates the vehicle wheel market. The polyurethane is strictly an adhesive material to secure the cover permanently to the wheel.

SUMMARY OF THE INVENTION

In contrast with the prior art, the vehicle wheel of the present invention uses an organic resin foam, such as polyurethane foam, as a structural load bearing member. An inner wheel disc, an outer decorative disc, and a rim interlocked with both those discs are interconnected and bonded by polyurethane foam. The polyurethane foam serves as a load bearing and load transmitting structural member. According to one method for manufacturing the instant wheel, the wheel rim, inner wheel disc, and outer decorative disc are positioned in a die, and a polyurethane composition is then injected into the volume defined by those wheel components for curing in situ. Alternatively, a polyurethane foam preform is adhesively bonded to the rim, inner wheel disc, and outer decorative disc in an assembly die.

The vehicle wheel of the present invention provides style flexibility and styling attractiveness. Furthermore, the instant wheel affords improved dimensional control, improved concentricity, and improved wheel balance in a vehicle wheel further characterized by low cost and light weight. Finally, since the resultant wheel is a solid wheel, noise control is insured.

BRIEF DESCRIPTION OF THE DRAWINGS

The instant invention can be best understood by reference to the following description of a preferred embodiment taken in connection with the accompanying drawings in which.

DESCRIPTION OF THE PREFERRED EMBODIMENT

Figure 1:
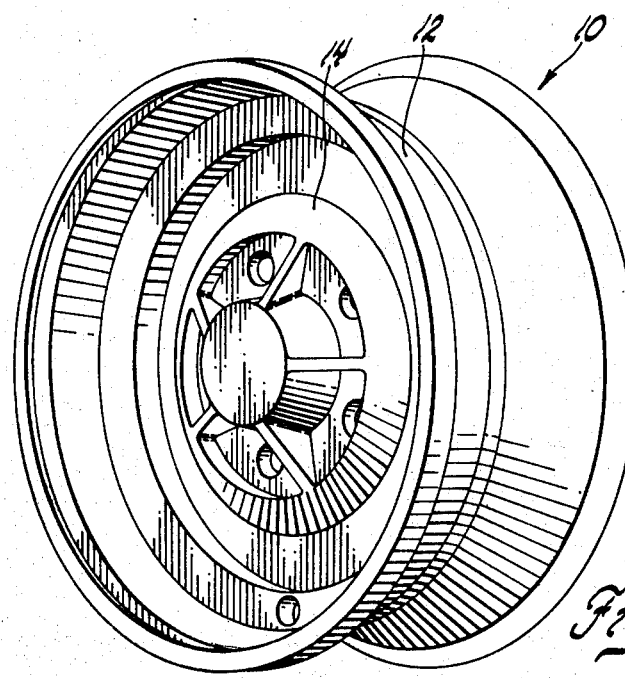
FIG. 1 is a perspective view of a vehicle wheel manufactured in accordance with the instant invention.

Reference should now be made to the drawings, and more particularly to FIG. 1, wherein a vehicle wheel 10 is illustrated. The vehicle wheel 10 includes a rim 12 and a styled front or outer disc 14. The wheel 10 also includes an inner disc 16 illustrated in FIGS. 2 and 3, but not visible in the perspective view of FIG. 1.

Figure 2:
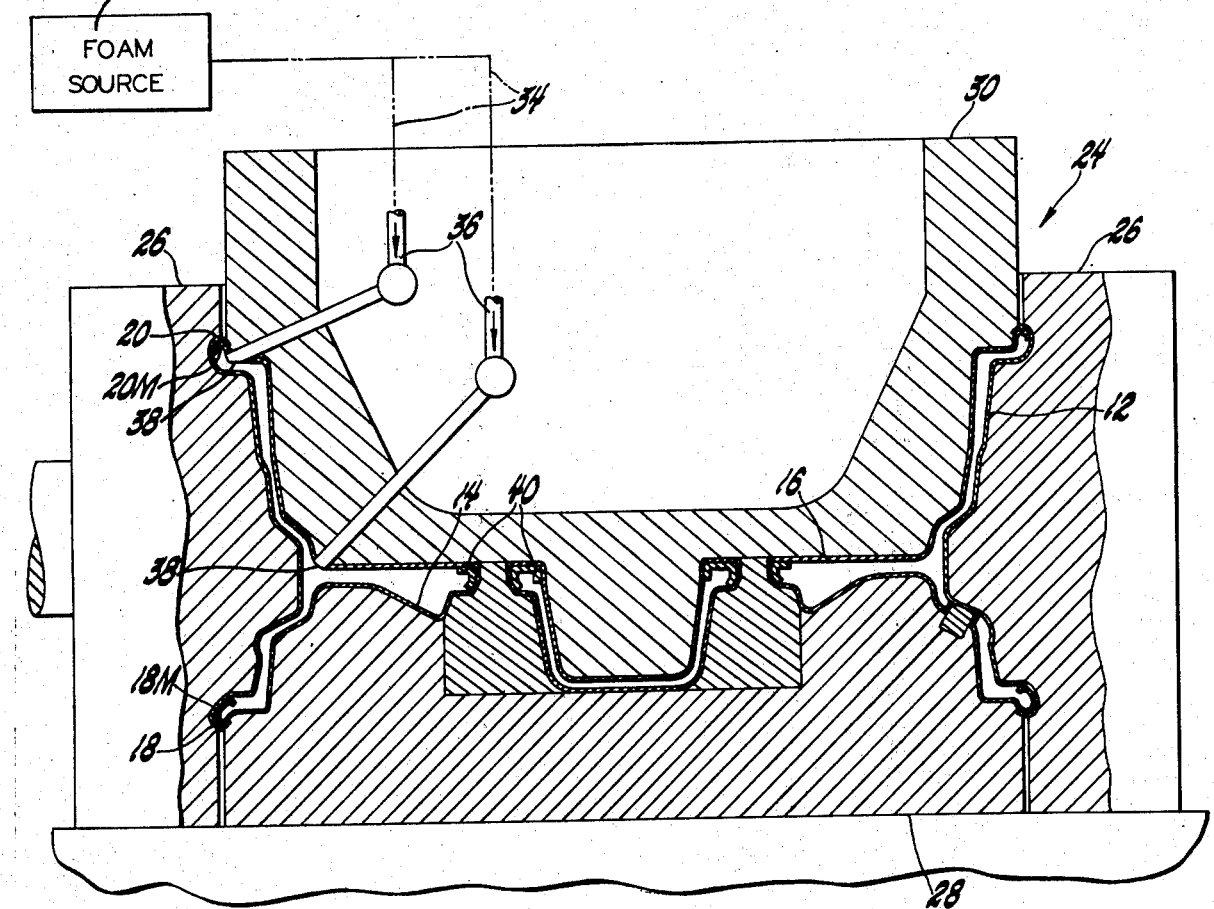
FIG. 2 is a sectional view of a fabarication die for retaining the vehicle wheel of FIG. 1 as it is foamed and cured in situ.
Figure 3:
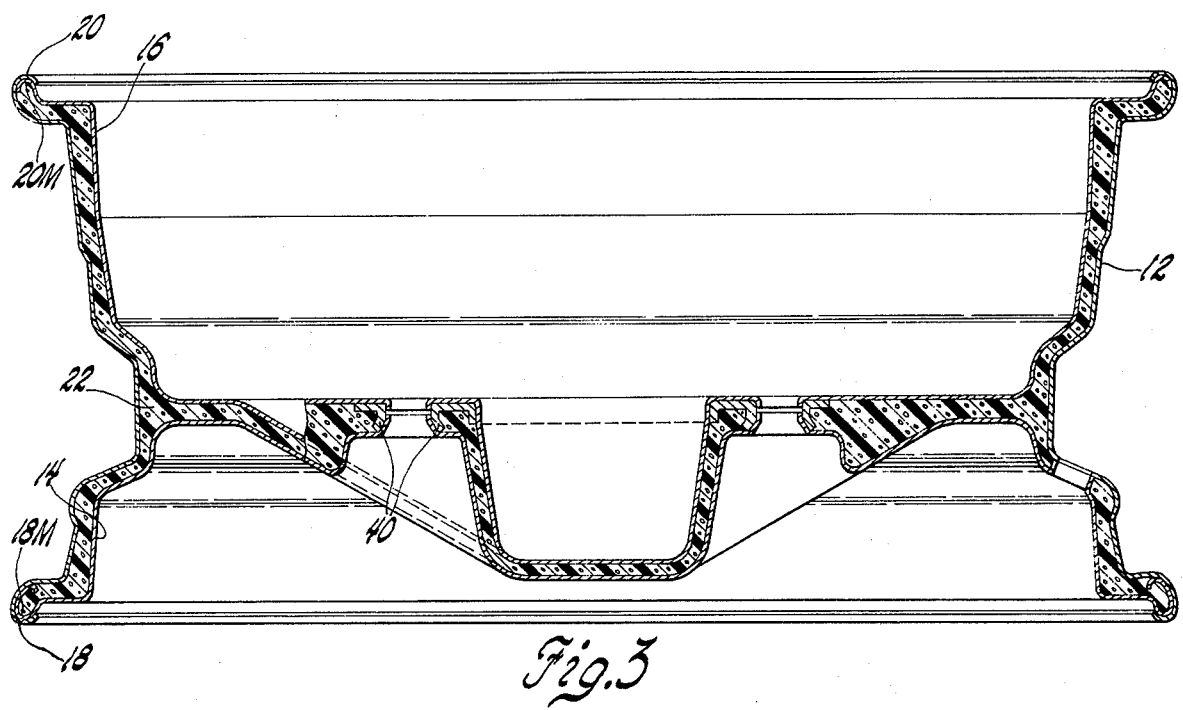
FIG. 3 is a cross-section of the vehicle wheel of FIG. 1.
Figure 4:
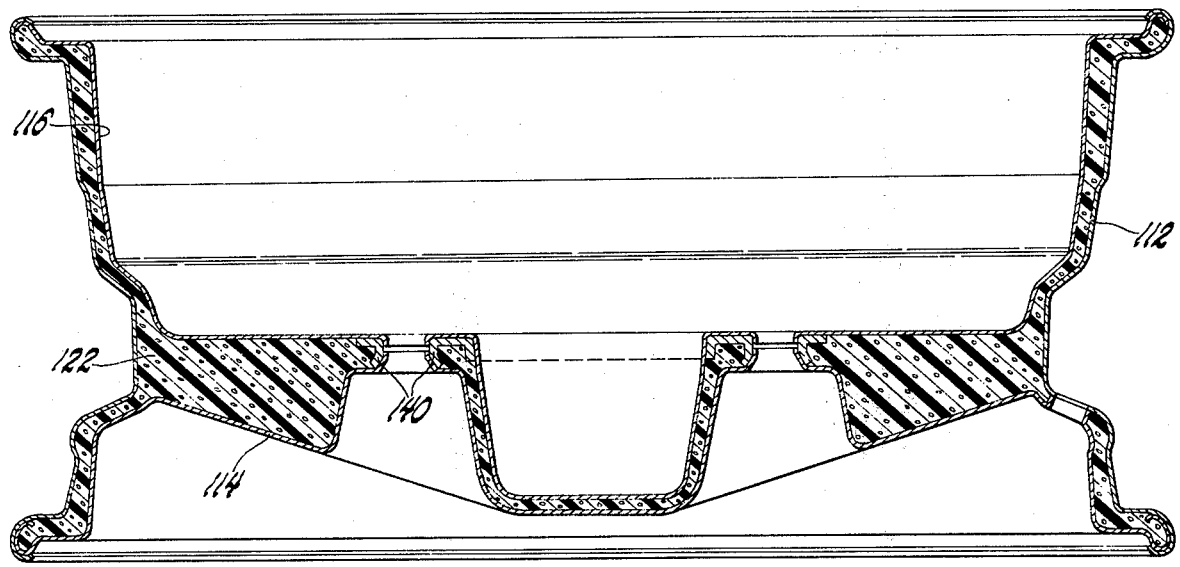
FIG. 4 is a cross-section of an alternative design of the vehicle wheel of the instant invention.

The rim 12 has spaced interlock lips 18 and 20 which interlock respectively with the outer disc 14 and the inner disc 16. As shown in FIGS. 2 and 3, the interlock lips 18 and 20 comprise the side edges of the rim 12 curved to form retaining grooves for the corresponding mating curved protions 18M and 20M of the outer and inner discs. The assembly of the rim 12, the outer disc 14, and the inner disc 16 is bonded together by an organic resin structural foam member 22 comprising, for example, polyurethane foam. The polyurethane foam member 22 fills the volume enclosed and defined by the rim 12, the outer disc 14, and the inner disc 16. The polyurethane foam member 22 is disposed as a load bearing and load transmitting element of the wheel. This aspect of the preferred embodiment is best shown in FIGS. 3 and 4.

In its preferred form, the wheel of the instant invention is fabricated with an outer skin entirely of steel. The outer disc 14 is made from stainless steel, and the rim 12 and inner disc 16 are made from cold rolled steel. Stainless steel stock 0.015 inches thick is suitable for the outer disc, and the disc can be given a high luster finish. The other wheel components, fabricated from cold rolled steel, are also made from stock 0.015 inches thick.

FIG. 2 depicts a fabrication die 24 including a plurality of rim retaining and support sections 26, a retaining and support section 28 for engagement with the outer disc 14, and a retaining and support section 30 for engagement with the inner disc 16. The die sections 26 are radially split, like pie wedges, to permit radial withdrawal and separation of those sections. The die sections 28 and 30 can be axially separated to permit loading and unloading of wheel components and finished wheels.

At the start of each cycle, a partially preformed rim is placed on the several die wedges 26 in their withdrawn positions. The outer disc 14 is placed on the die section 28, and the inner disc 16 is placed on the die section 30. The die 24 is then activated to position the wheel components. As the die wedges 26 are advanced radially inward, they form the rim 12 to its final configuration in which the two circumferential ends of the rim 12 overlap. The interlock lips 18 and 20 envelop the corresponding mating portions 18M and 20M of the inner and outer discs as the die wedges 26 are advanced to their final positions.

After the rim 12, the outer disc 14, and the inner disc 16 are positioned by the die, an organic resin composition, polyurethane in the illustrated embodiment, is introduced into the cavity defined and enclosed by those wheel components. A foam source 32 supplies the composition through connectors 34 and into the wheel cavity through passages 36 in the die and inlet ports 38 in the wheel elements. In the illustrated embodiment, the inlet ports 38 are located in the inner disc 16. The organic resin composition is introduced into the wheel cavity as a liquid, and the foaming and curing process occurs thereafter. The pressures of the foaming process can be used to final form the wheel components.

To increase adhesiveness, the rim 12, the outer disc 14, and the inner disc 16 can be coated on the appropriate surfaces with oganic resin. Alternatively, a roughened texture can be provided to improve bonding of the foam to the wheel components.

As an alternative to the fabrication technique described above in connection wth FIG. 2, the wheel of the present invention can be assembled using a foam preform. Following such a procedure, an adhesive, such as epoxy, is applied to the metal wheel components, and the foam preform would be positioned in the die 24 prior to closing the die sections to form the wheel.

For either fabrication process, after the wheel is assembled, the die sections are separated, and the finished wheel is removed.

In the illustrated embodiment a steel insert 40 reinforces the wheel when the wheel is mounted on a vehicle. The insert 40 serves as a load bearing element of the wheel which carries and distributes the wheel load. As illustrated in the drawings, the insert 40 is an annulus or collar encircling the center of the wheel and provided with apertures or holes for the mounting lugs used to mount the wheel on the vehicle.

The finished wheel is illustrated in cross-section in FIG. 3. The foam member 22 of the finished wheel is a structural member both supporting and transmitting load forces. Load forces are transmitted between the axle or wheel attachment point and the load surface through the foam 22 and the rim 12.

FIGS. 3 and 4 include the same wheel components. FIG. 4 includes a rim 112, an outer disc 114, and an inner disc 116, interconnected and bonded by a load bearing and load transmitting organic resin foam member 122. The embodiment of FIG. 4 also includes a steel insert 140, which is equivalent to the insert 40, to carry and distribute the wheel load. The difference between the two wheels resides in the design of the outer discs 14 and 114. This difference illustrates the flexibility available in the design of wheels made according to the present invention.

Although the foregoing has proceeding in terms of a particular illustrated embodiment, it is to be understood that various changes and modifications could be engrafted thereon by one skilled in the art within the spirit and scope of the appended claims.

The embodiments of the invention in which an exclusive property or privilege is claimed are:

1. A vehicle wheel, comprising: an outer skin including a plurality of members secured to each other to define a cavity, the cavity including an annular rim portion and an interconnected disc portion located within the annular configuration of the rim portion, the rim portion of the cavity projecting axially from the disc portion to the opposite axial sides of the wheel, and foam filling said cavity and engaging and being adhered to the members of said outer skin so as to cooperate therewith as a load bearing and transmitting component of the wheel.

2. A vehicle wheel as in claim 1 wherein said outer skin includes a styled outer disc.

3. A vehicle wheel as in claim 2 wherein said styled outer disc is fabricated from stainless steel.

4. A vehicle wheel as in claim 2 wherein said outer skin also includes an inner disc and a rim.

5. A vehicle wheel as in claim 4 wherein said outer disc, said inner disc, and said rim are bonded together by said foam.

6. A vehicle wheel as in claim 5 wherein said outer disc is fabricated from stainless steel.

7. A vehicle wheel as in claim 6 wherein said inner disc and said rim are both fabricated from steel.

8. A vehicle wheel as in claim 7 wherein said structural foam comprises polyurethane foam.

9. A vehicle wheel as in claim 4 wherein said rim includes a portion interlocked with said inner disc.

10. A vehicle wheel as in claim 9 wherein said rim includes a portion interlocked with said outer disc.

11. A vehicle wheel, comprising: a stainless steel styled outer disc, a steel inner disc, a steel rim interlocked with both said outer disc and said inner disc so as to cooperate therewith to define a cavity, the cavity including an annular rim portion and an interconnected disc portion located within the annular configuration of the rim portion, the rim portion of the cavity projecting axially from the disc portion to the opposite axial sides of the wheel, and polyurethane polyurethane foam received within and filling the cavity, said polyurethane foam engaging and being adhered to said outer disc, said inner disc, and said rim so as to cooperate therewith as a load bearing and transmitting component of the wheel.

* * * * *

UNITED STATES PATENT OFFICE
CERTIFICATE OF CORRECTION

Patent No. 3,968,996    Dated July 13, 1976

Inventor(s) Raymond J. Wilcox

It is certified that error appears in the above-identified patent and that said Letters Patent are hereby corrected as shown below:

Column 3, line 24, "wth" should be --with--.

Column 4, line 49, delete "polyurethane polyurethane".

Column 4, line 50, delete "polyurethane".

Signed and Sealed this

Twenty-eighth Day of September 1976

[SEAL]

Attest:

RUTH C. MASON
*Attesting Officer*

C. MARSHALL DANN
*Commissioner of Patents and Trademarks*